(12) United States Patent
Sharma et al.

(10) Patent No.: US 12,269,343 B2
(45) Date of Patent: Apr. 8, 2025

(54) MULTIPLEXED FLOATING AUTOSTEREOSCOPIC 3D DISPLAY

(71) Applicant: GM Global Technology Operations LLC, Detroit, MI (US)

(72) Inventors: Manoj Kumar Sharma, Troy, MI (US); Thomas A. Seder, Fraser, MI (US); Joseph F. Szczerba, Grand Blanc, MI (US); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 18/357,659

(22) Filed: Jul. 24, 2023

(65) Prior Publication Data

US 2025/0033468 A1    Jan. 30, 2025

(51) Int. Cl.
| | |
|---|---|
| G02B 27/01 | (2006.01) |
| B60K 35/00 | (2006.01) |
| G02B 30/56 | (2020.01) |
| G03H 1/26 | (2006.01) |
| H04N 13/32 | (2018.01) |
| H04N 13/368 | (2018.01) |
| H04N 13/383 | (2018.01) |
| B60K 35/23 | (2024.01) |

(52) U.S. Cl.
CPC ............. *B60K 35/00* (2013.01); *G02B 30/56* (2020.01); *G03H 1/2645* (2013.01); *H04N 13/32* (2018.05); *H04N 13/368* (2018.05); *H04N 13/383* (2018.05); *B60K 35/23* (2024.01); *B60K 2360/21* (2024.01); *B60K 2360/23* (2024.01); *B60K 2360/29* (2024.01)

(58) Field of Classification Search
CPC .... H04N 13/32; H04N 13/368; H04N 13/383; G02B 30/56; G03H 1/2645
See application file for complete search history.

(56) References Cited

U.S. PATENT DOCUMENTS

| | | | | |
|---|---|---|---|---|
| 2013/0147854 | A1* | 6/2013 | Huang | H04N 13/32 353/30 |
| 2014/0361990 | A1* | 12/2014 | Leister | G02B 30/31 345/156 |
| 2016/0255338 | A1* | 9/2016 | Song | G03H 1/08 348/47 |
| 2017/0235372 | A1* | 8/2017 | Song | G03H 1/2286 345/158 |
| 2021/0223568 | A1* | 7/2021 | Makinen | G02B 27/4272 |

(Continued)

*Primary Examiner* — Md N Haque
(74) *Attorney, Agent, or Firm* — Vivacqua Crane, PLLC (57) ABSTRACT

A multiview campfire display includes a light source configured to emit a light beam and a spatial light modulator (SLM) positioned to receive the light beam emitted by the light source. The holographic display also includes a user tracker configured to track the head and eyes of the vehicle occupants. The display also includes a controller in communication with the user tracker, the light source, and the SLM. The controller is programmed to receive a eye-tracking signal from the user tracker and control a polarization optics of the light beam emitted by the light source and modulated by the SLM to reroute the image encoded by the SLM for the plurality of vehicle occupants based on the eye-tracking signal, thereby allowing each of the plurality of vehicle occupants to view the image.

15 Claims, 6 Drawing Sheets

(56) References Cited

U.S. PATENT DOCUMENTS

2022/0137479 A1* 5/2022 Won .................. G03H 1/0005
359/34
2022/0270645 A1* 8/2022 Song ................ G02B 27/0093

* cited by examiner

MULTIPLEXED FLOATING AUTOSTEREOSCOPIC 3D DISPLAY

INTRODUCTION

The present disclosure relates to displays and, more specifically, to multiplexed floating autostereoscopic displays.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In vehicles with camp-fire seating, it is desirable to display a hologram that is visible to all the passengers. In this case, the display should be able to show the hologram to multiple vehicle occupants seating around with the minimum hardware possible.

SUMMARY

The present disclosure describes multiplexed floating autostereoscopic displays. According to one aspect of the present disclosure, the multiview campfire display includes a light source configured to emit a light beam and a spatial light modulator (SLM) positioned to receive the light beam emitted by the light source. The SLM is configured to encode an image. The holographic display also includes a user tracker (e.g., eye tracker) configured to track the head and eyes of the vehicle occupants. The user tracker is configured to generate an eye-tracking signal. The eye-tracking signal is indicative of a position of the eyes of each of the plurality of vehicle occupants. The display also includes a controller in communication with the user tracker, the light source, and the SLM. The controller is programmed to: receive the eye-tracking signal from the user tracker and control a polarization optics of the light beam emitted by the light source and modulated by the SLM to reroute the image encoded by the SLM for the plurality of vehicle occupants based on the eye-tracking signal, thereby allowing each of the plurality of vehicle occupants to view the image. The image is rerouted to multiple users using one of the three techniques described below (e.g., SLM grating, digital micromirror device (DMD) or liquid crystal (LC) polarization rotator). The SLM and the rerouting device (e.g., SLM grating, digital micromirror device (DMD) or liquid crystal (LC) polarization rotator) are synchronized to send same or different images to multiple vehicle occupants. It is time sequencing of images.

In another aspect of the present disclosure, the user tracker includes at least one camera. The display may include a plurality of reflectors and a plurality of movable mounts each coupled to one of the plurality of reflectors to allow each of the plurality of reflectors to move. The controller is in communication with the plurality of movable mounts. The controller is programmed to command each of the plurality of movable mounts to align the image to eyes of each of the plurality of vehicle occupants. Each of the plurality of reflectors may be a galvanized metal mirrors. Each of the plurality of movable mounts may be gimbal mounts. The controller is programmed to control the light source and the SLM to use a holographic grating to reroute the image encoded by SLM.

In another aspect of the present disclosure, the multiview campfire display may include a digital micromirror device (DMD) positioned to receive the image encoded by the SLM. The DMD is configured to reroute the image encoded by the SLM for the plurality of vehicle occupants. The DMD is in communication with the controller. The controller is programmed to control the DMD to reroute the image encoded by the SLM for the plurality of vehicle occupants based on the eye-tracking signal, thereby allowing each of the plurality of vehicle occupants to view the image.

In another aspect of the present disclosure, the display includes a tunable liquid crystal (LC) polarization rotator positioned to receive the image encoded by the SLM. The controller is programmed to control the tunable LC polarization rotator to reroute the image encoded by the SLM for the plurality of vehicle occupants based on the eye-tracking signal, thereby allowing each of the plurality of vehicle occupants to view the image. The tunable LC polarization rotator is positioned to receive the image encoded by the SLM. The controller is programmed to control the tunable LC polarization rotator to reroute the image encoded by the SLM for the plurality of vehicle occupants based on the eye-tracking signal, thereby allowing each of the plurality of vehicle occupants to view the image. The multiview campfire display may include a polarized beam splitter (PBS) downstream of the tunable LC polarization rotator, and the pbs is configured to reroute the image encoded by SLM.

In another aspect of the present disclosure, a vehicle includes a vehicle body. The vehicle body defines a passenger compartment. The vehicle further includes the multiview campfire display described above in the passenger compartment.

The present disclosure also describes a method for displaying a hologram. The method includes activating light source to emit a light beam; modulating, using a spatial light modulator (SLM), the light beam to encode an image; and controlling a polarization optics of the light beam to reroute the image encoded by the SLM for a plurality of vehicle occupants, thereby allowing each of the plurality of vehicle occupants to view the image.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
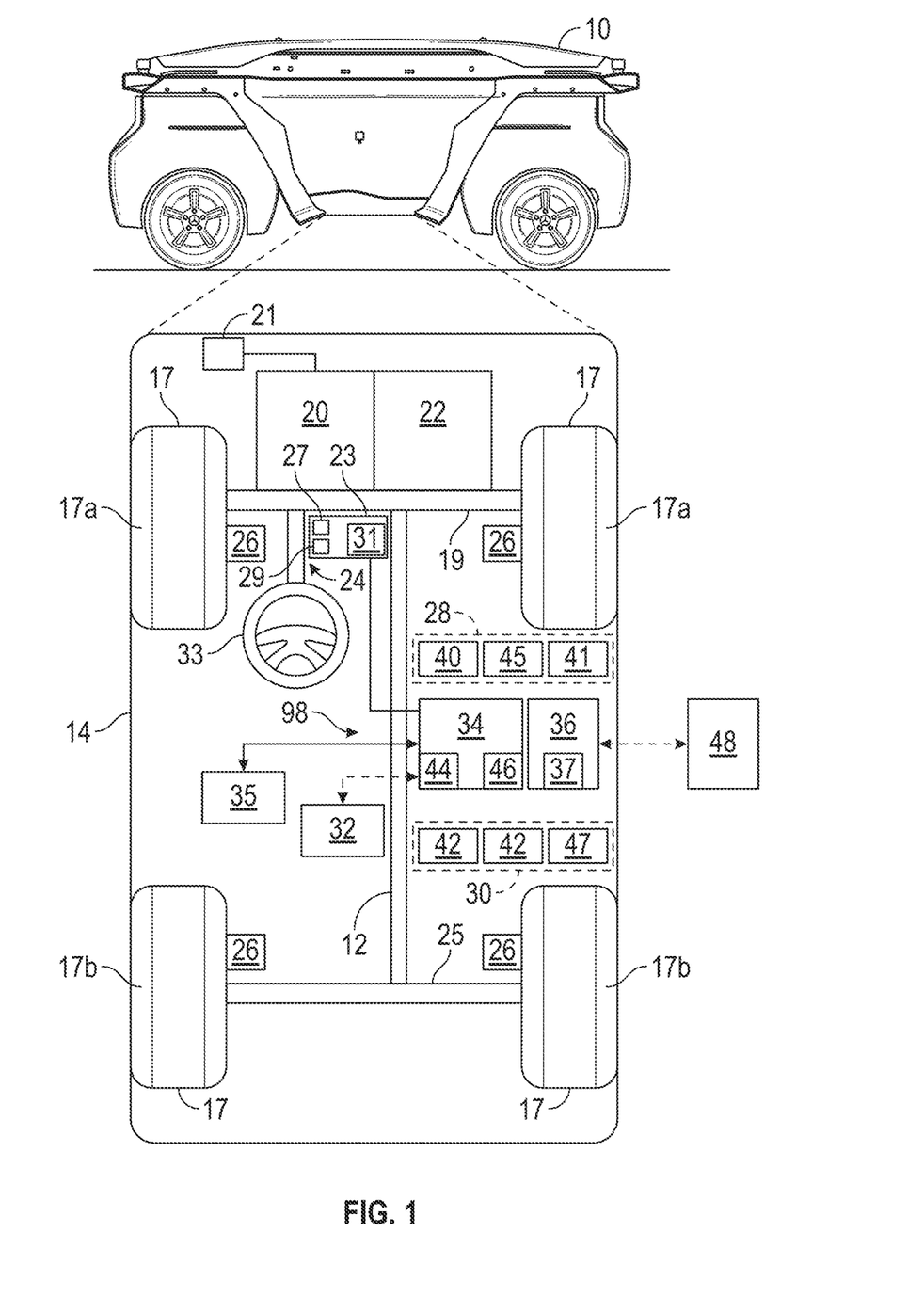
FIG. 1 is a block diagram depicting a vehicle including a display.

With reference to FIG. 1, a vehicle 10 generally includes a chassis 12, a vehicle body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle, and a control system 98 is incorporated into the vehicle 10. The control system 98 may be referred to as the system or the system for user interaction with one or more holographic displays 29. The vehicle 10 is, for example, a vehicle that is automatically controlled to carry passengers from one location to another. The vehicle 10 may be configured as a truck, sedan, coupe, sport utility vehicle (SUV), recreational vehicles (RVs), etc. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 31, one or more gyroscopes, one or more accelerometers, one or more inclinometers, one or more speed sensors, one or more three-dimensional (3D) depth sensor 45, one or more ultrasonic sensors, one or more inertial measurement units (IMUs), thermal imaging sensors, one or more microphones 31 and/or other sensors. Each sensor 40 is configured to generate a signal that is indicative of the sensed observable conditions (i.e., sensor data) of the exterior environment and/or the interior environment of the vehicle 10. Because the sensor system 28 provides sensor data to the controller 34, the sensor system 28 and its sensors 40 are considered sources of information (or simply sources).

The 3D depth sensors 45 are configured to acquire multi-point distance information across a Field-of-View (FoV) and measure the distance from the 3D depth sensors 45 to an object, such as a hand 15, within the FoV of the 3D depth sensor 45. Therefore, the 3D depth sensors 45 can output a matrix of multiple distance readings over the FoV to obtain an accurate picture with full 3D depth perception. As non-limited examples, the 3D depth sensors 45 may be Time-of-Flight sensors and stereo depth cameras. Stereo depth cameras may use Time-of-Flight principles and infrared light to determine the depth of a scene and construct a 3D model and spatially map the interior of the passenger compartment 54 in space as well as the position of the body 13 of the vehicle user 11 and the location of the hand 15 of the vehicle user 11. The body 14 of the vehicle 10 defines the passenger compartment 54.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

One or more of the actuator devices 42 are configured as a haptic actuator 47. The haptic actuator 47 is configured to provide haptic feedback to the vehicle user 11. In other words, the haptic actuator 47 is configured to create an experience of touch by applying forces, vibrations, or motions to the vehicle user 11 inside the passenger compartment 54. As non-limiting examples, the haptic actuator 47 may be piezoelectric actuator, an eccentric rotating mass (ERM) actuator, a linear resonant actuator (LRA), ultrasound actuators, and/or a non-contact haptic actuator, such as air vortex ring actuators. The air vortex ring actuator may provide an air pulse to the vehicle user 11. The haptic actuator 47 is in communication with the controller 34, and the controller 34 is programmed to control the operation of the haptic actuator 47.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, reroute from the controller 34, or part of the controller 34 and part of a reroute system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 16) as described in detail below.

The instructions may include one or more reroute programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more holographic displays 29, one or more microphones 31 (e.g., a microphone array) and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (e.g., vehicle operator). Accordingly, the controller 34 is configured to receive inputs from the user via the user interface 23. While the microphone 31 is shown in FIG. 1 as part of the user interface 23, other microphones 31 may be part of the sensor system 28. The microphones 31 may be directly coupled to a headliner 52 of the vehicle 10 to capture voice commands from one or more passengers 11 in the passenger compartment 54 of the vehicle 10. It is envisioned, however, that the microphones 31 may be coupled to other parts of the vehicle 10. Regardless of its exact location, the microphones 31 is in communication with the controller 34. Accordingly, the microphone 31 may send sensor data (e.g., voice commands) to the controller 34.

The vehicle 10 may include one or more holographic displays 29 configured to display a 3D hologram 50 to one or more vehicle occupants 11. The holographic display 29 is configured to present one or more 3D holograms 50 to vehicle passengers 11 inside the passenger compartment 54. While the holographic display 29 is shown in FIG. 1 as part of the user interface 23, it is contemplated that the holographic display 29 may be directly coupled to the headliner 52 of the vehicle 10 in order to present one or more 3D holograms 50 to the vehicle passengers 11 inside the passenger compartment 54. However, it is contemplated that the holographic display 29 may be attached to another part of the vehicle 10. Regardless of its exact location, the holographic display 29 is in communication with the controller 34. Accordingly, the controller 34 is configured to control the operation of the holographic display 29.

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
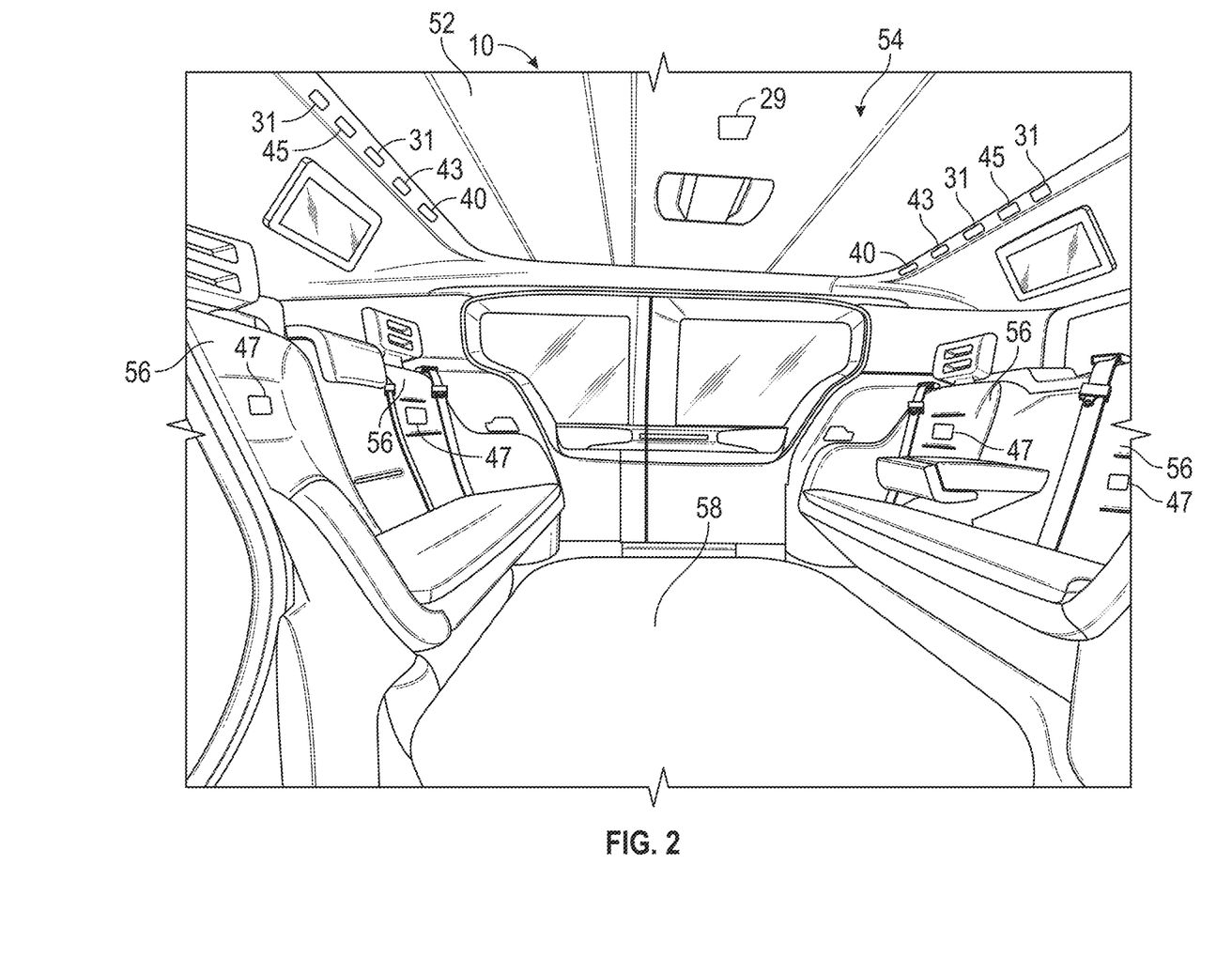
FIG. 2 is a schematic isometric side view of a passenger compartment of the vehicle of FIG. 1.
Figure 3:
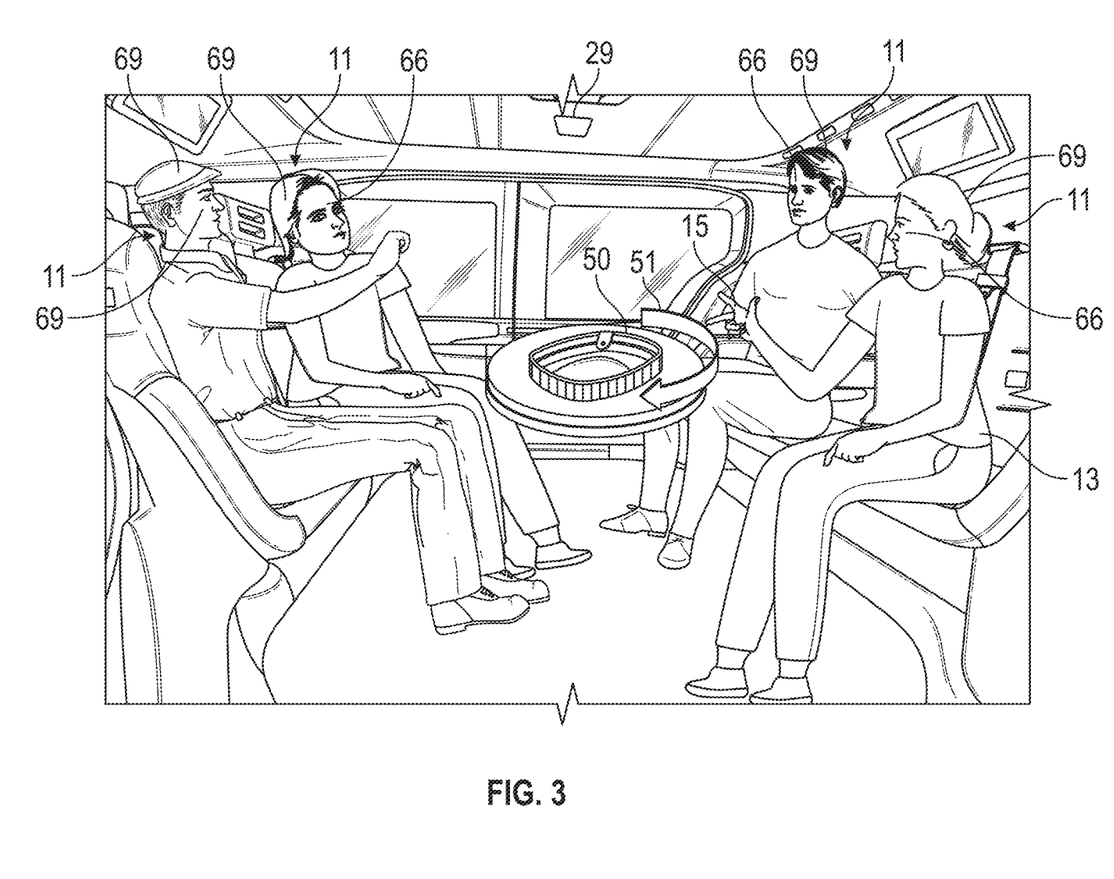
FIG. 3 is a schematic isometric side view of a passenger compartment of the vehicle of FIG. 1, depicting a three-dimensional (3D) hologram.

With reference to FIGS. 2 and 3, the vehicle 10 includes a passenger compartment 54 shaped and sized to accommodate a plurality of passengers (i.e., vehicle occupants 11). In addition, the vehicle 10 includes a plurality of seats 56 inside the passenger compartment 54. The seats 56 are arranged in camp-fire seating configuration. In other words, some sets of seats 56 face another set of seats 56, resembling the way humans sit around a campfire. The passenger compartment 54 is delimited by the headliner 52 and a vehicle floor 58 of the vehicle 10.

With continuing reference to FIGS. 2 and 3, the haptic actuators 47 may be directly coupled to some or all of the seats 56 to facilitate providing haptic feedback to the vehicle occupants 11 seated in the seats 56. It is contemplated, however, that the haptic actuators 47 may be coupled to other parts of the vehicle 10 inside the passenger compartment 54. At least some of the sensors 40 may be directly coupled to the headliner 52 of the vehicle to facilitate sensing movements by the vehicle occupants 11 and voice commands from the vehicle occupants 11 inside the passenger compartment 54. For instance, the microphones 31 may be directly coupled to the headliner 52 of the vehicle 10 to capture voice commands from one or more vehicle occupants 11 (e.g., passengers) in the passenger compartment 54 of the vehicle 10. The 3D depth sensors 45 may be directly coupled to the headliner 52 of the vehicle 10 to facilitate sensing the 3D location of each vehicle user 11 in the passenger compartment 54 of the vehicle 10. The cameras 31 may be directly coupled to the headliner 52 of the vehicle 10 to facilitate capturing images of the vehicle occupants 11 in the passenger compartment 54. The user trackers 43 may include one or more cameras 31 to track the movements of the head 69 and/or the eyes 66 of the vehicle user 11 inside the passenger compartment 54. The user trackers 43 may be referred to as eye trackers. The user trackers 43 may be directly coupled to the headliner 52 of the vehicle 10 to facilitate tracking the head 69 and/or the eyes 66 of the vehicle occupants 11 inside the passenger compartment 54.

With continued reference to FIGS. 2 and 3, the holographic display 29 may be directly coupled to the headliner 52 of the vehicle 10 in order to present one or more 3D holograms 50 to the vehicle passengers 11 inside the passenger compartment 54. However, it is contemplated that the holographic display 29 may be attached to another part of the vehicle 10. As depicted in FIG. 3, the vehicle occupants 11 may be seated around a common 360 perimeter display (i.e., the holographic display 29). Each vehicle user 11 has a different personal view of the common hologram 50 from their perspective. Any vehicle user 11 may use their hands 15, eyes 66, and/or voice to interact and manipulate the hologram 50. Multiple vehicle occupants 11 may cooperate in the manipulation of the common hologram 50 by simultaneously manipulating (e.g., by virtually touching, bending, stretching, folding, twisting, etc.) different parts of the hologram 50. When doing so, the other users' perspective (i.e., viewpoints) of the common hologram is changed accordingly. The haptic actuator 47 may provide haptic feedback to the vehicle user 11 that is manipulating the hologram 50. The 3D hologram 50 spans 360 degrees around the holographic display 29 and may include, but is not limited to, an upcoming destination (e.g., stadium), a vehicle route and progress, information about vehicle technologies, internet searches on anything, information shared live from other at a different location not in the vehicle 10, etc.

Figure 4:
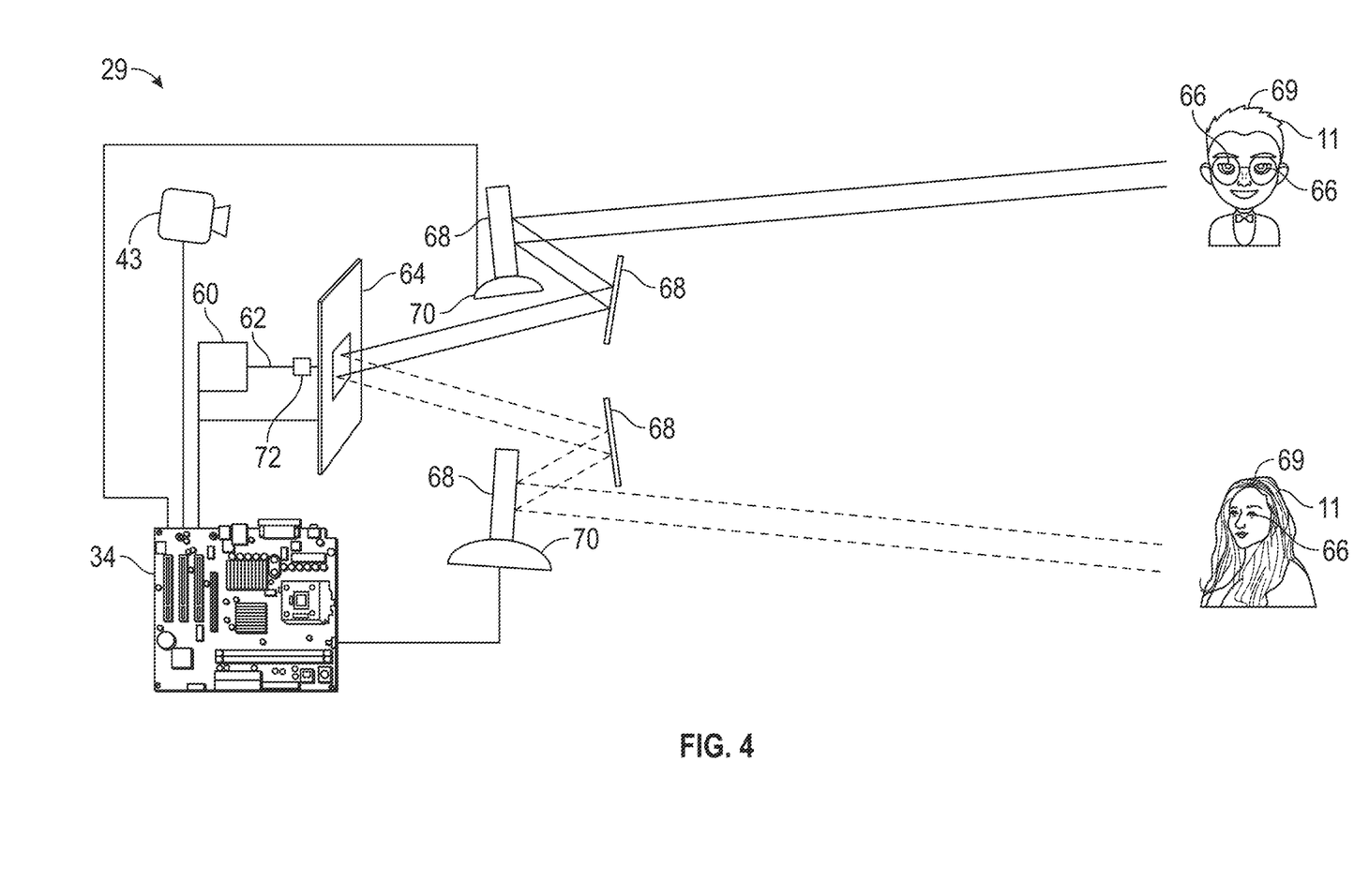
FIG. 4 is a schematic diagram of a holographic display with holographic gratings.

With reference to FIG. 4, the holographic display 29 may be referred to as a floating autostereoscopic 3D display or a multiview campfire display. The configuration of the holographic display 29 allows a reduction in the number of displays, or the optical complexity used to create 3D campfire hologram. As such, the holographic displays 29 is considered a true floating-in-space holographic autostereoscopic 3D display. Accordingly, the vehicle 10 may include fewer holographic display 29 than seats 56. The holographic display 29 controls the polarization optics to reroute images for two or more viewers (i.e., vehicle occupants 11). The holographic display 29 may also enable sequential imaging for multiple users (i.e., vehicle occupants 11) with high power illumination requirements. The holographic display 29 is in electronic communication with the controller 34. The controller 34 is also in communication with one or more user trackers 43. As discussed above, one or more cameras 31 may be configured as user trackers 43 to track the movements of the head 69 and/or the eyes 66 of the vehicle user 11 inside the passenger compartment 54. The user tracker 43 is configured to track a head and eyes of the vehicle occupants 11. For instance, the user tracker 43 is configured to generate an eye-tracking signal. The eye-tracking signal is indicative of the position of the eyes of each of the vehicle occupants 11.

With continued reference to FIG. 4, the holographic display 29 includes one or more light sources 60 in communication with the controller 34. Accordingly, the controller 34 may control the operation of the light source 60. The light source 60 is configured to emit one or more light beams 62. The holographic display 29 further includes a spatial light modulator (SLM) 64 positioned to receive the light beam 62 emitted by the light source 60. Accordingly, the SLM 64 is in optical communication with the light source 60. The SLM 64 is an object that imposes some form of spatially varying modulation on a beam of light. Accordingly, the SLM 64 is configured to modulate the light beam 62 and encode an image using the light beam 62.

With continued reference to FIG. 4, the controller 34 is in communication with the user tracker 43, the light source 60, and the SLM 64 and is programmed to receive the eye-tracking signal. The controller 34 is further programmed to control the light source 60 and the SLM 64 to control the polarization optics control of the light beam 62 emitted by the light source 60 and modulated by the SLM 64 to reroute the image encoded by the SLM 64 for the vehicle occupants 11 based on the eye-tracking signal, thereby allowing each of the vehicle occupants 11 to view the image as discussed in detail below. At least two reflectors 68 are positioned in optical communication with the SLM 64 to receive the modulated light from the SLM 64. The reflectors 68 serve as mirror and are configured to reflect the light modulated by the SLM 64. As a non-limiting example, the reflectors 68 may be made of galvanized metal and are therefore galvanized metal mirrors. The reflectors 68 may be coated with a variety of reflective coatings with or without polarization dependent attributes. Movable mounts 70 are coupled to all or some of the reflectors 70 to allow the reflectors 70 to move. As a non-limiting example, the movable mounts 70 may be gimbal mounts to facilitate movement of the reflectors 68. The controller 34 is in communication with the movable mounts 70 and is programmed to command each of the movable mounts 70 to align the image to eyes of each of the vehicle occupants 11 based on the eye-tracking signals received from the user trackers 43. Thus, the movable mounts 70 work in coordinate with the user trackers 43 to align the images with the position of the eyes 66 of the vehicle occupants 11.

With continued reference to FIG. 4, the controller 34 is programmed to control the light source 60 and the SLM 64 to use a holographic gratings 72 to reroute the image encoded by the SLM 64. The holographic grating 72 is a type of diffraction grating formed by an interference-fringe field of two laser beams whose standing-wave pattern is exposed to a set of photosensitive materials. The holographic grating 72 is in optical communication with the light source 60 and the SLM 64 to reroute the image, thereby allowing all the vehicle occupants 11 to view the image. The holographic gratings 72 may be described by the frequency of grating lines, where:

$$f = \frac{10^6}{\Lambda} \qquad \text{Eq. 1}$$

where:
f is the grating frequency in lines/mm
Λ if the grating period in nm.
The grating equation may be expressed as follows:

$$\sin\theta_m = \sin\theta + m\frac{\lambda}{\Lambda} \qquad \text{Eq. 2}$$

where:
θ is the incident light angle with respect to the grating normal;
$\theta_m$ is the diffraction angle of $m^{th}$ order with respect to the grating normal;
m is the diffraction order number;
λ is the illumination wavelength; and
Λ if the grating period in nm.

Figure 5:
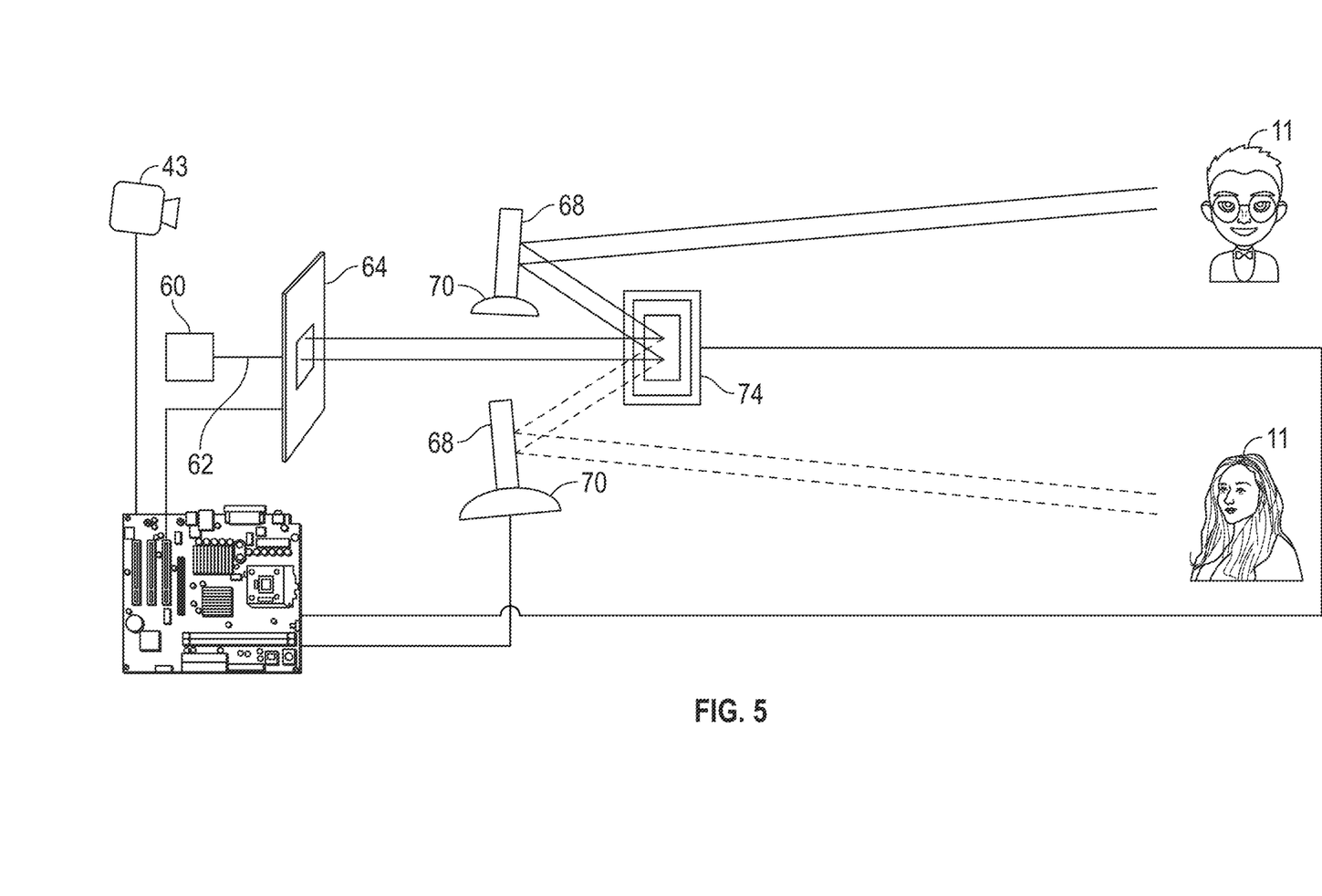
FIG. 5 is a schematic diagram of a holographic display with a digital micromirror device.

With reference to FIG. 5, instead of holographic gratings 72, the holographic display 29 includes a digital micromirror device (DMD) 74 in optical communication with the reflectors 68. The DMD 74 may encode images and is a digitally controlled micro-opto-electromechanical system (MOEMS) spatial light modulator (SLM) and can module the amplitude and direction of the light beam 62. The DMD 74 includes an array of mirrors and can create light patterns with speed, precision, and efficiency. Accordingly, the DMD 74 is positioned to receive the image encoded by the SLM 64 after the light has been reflected by the reflectors 68. The DMD 74 is configured to reroute the image encoded by the SLM 64 for the vehicle occupants 11. The DMD 74 is in communication with the controller 34. The controller 64 is programmed to control the DMD 74 to reroute the image encoded by the SLM 64 for the vehicle occupants 11 based on the eye-tracking signal generated by the user trackers 43, thereby allowing each of the vehicle occupants 11 to view the image.

Figure 6:
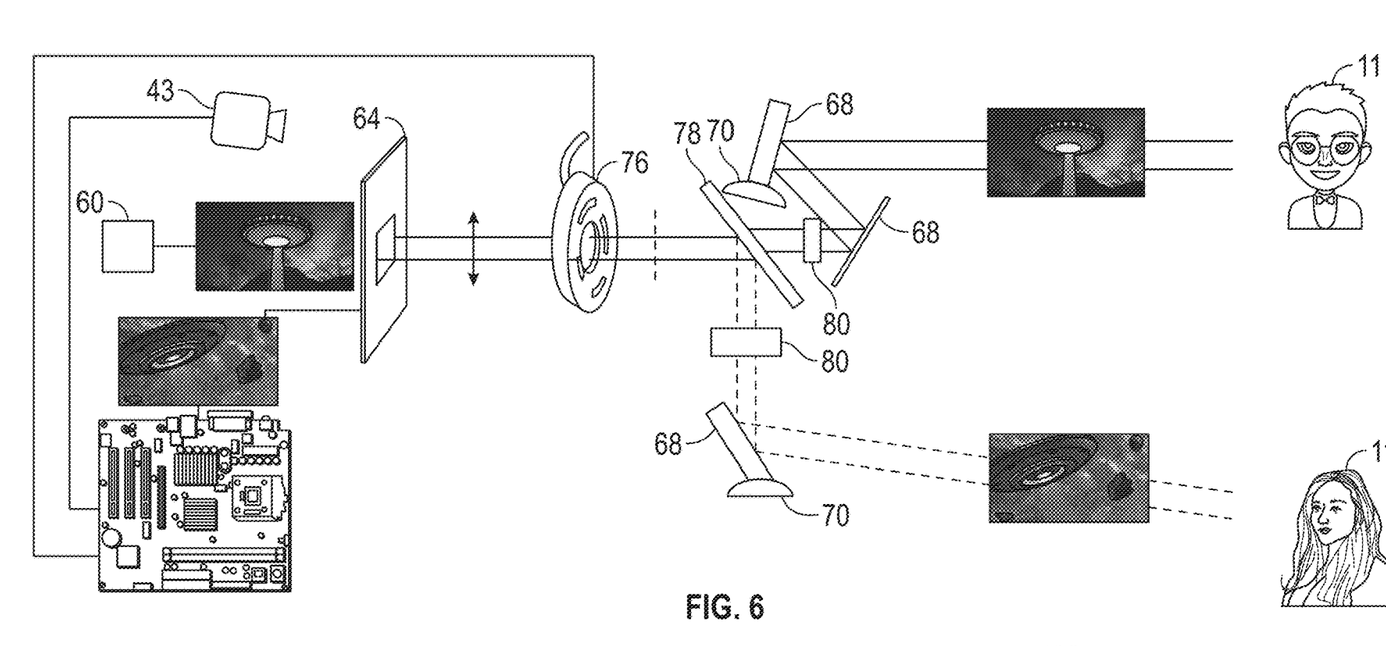
FIG. 6 is a schematic diagram of a holographic display with a tunable LC polarization rotator.

With reference to FIG. 6, instead of the DMD 74 or holographic gratings 72, the holographic display 29 includes a tunable liquid crystal (LC) polarization rotator 76 in communication with the controller 34. The tunable LC polarization rotator 76 is positioned to receive the image encoded by the SLM 64. The controller 34 is programmed to control the tunable LC polarization rotator 76 to reroute the image encoded by the SLM 64 for the vehicle occupants 11 based on the eye-tracking signal, thereby allowing each of the vehicle occupants 11 to view the image. The LC polarization rotator 76 includes a liquid crystal variable retarder and a quartz zero-order quarter-wave plate, and the LC retarder and wave plate have their fast axes oriented at 45° with respect to each other. When voltage is applied to the tunable liquid crystal (LC) polarization rotator 76, the image is rerouted. However, when no voltage is applied to the tunable liquid crystal (LC) polarization rotator 76, the image changes path and is rerouted. A polarized beam splitter (PBS) 78 is positioned downstream of the tunable LC polarization rotator 76. The PBS 78 is configured to reroute the image encoded by the SLM 64. Linear polarizers 80 are positioned downstream of the PBS 78 to minimize polarization leakage. The polarization rotation wavelength is wavelength dependent. Thus, the polarization of the R, G, and B beams will be rotated differently and, due to this, there will be some leakage of polarization through the linear polarizers 80 after the PBS 78 is aligned with the corresponding polarization states to help reduce or eliminate the leakage.

Figure 7:
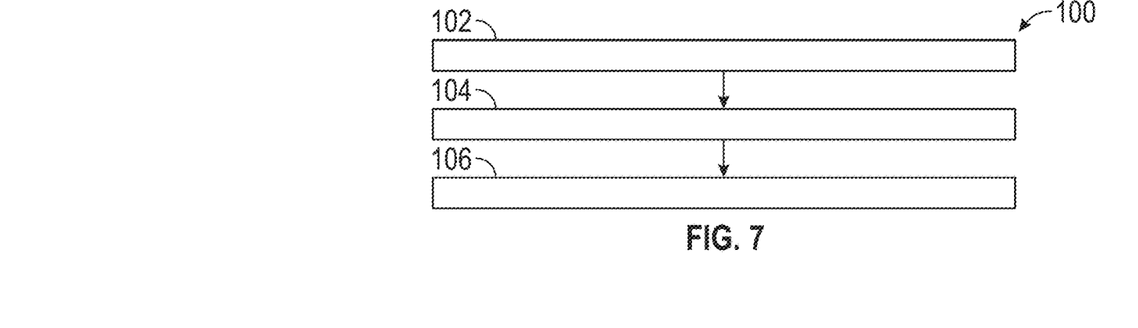
FIG. 7 is a flowchart for a method for displaying a hologram.

FIG. 7 is a flowchart of a method 100 for displaying a hologram to multiple vehicle occupants 11 inside the vehicle 10. The method 100 begins at block 102. At block 102, the controller 34 activates the light source 60 to emit the light beam 60. Then, the method 100 proceeds to block 104. At block 104, the light beam 62 is modulated by the SLM 64 to encode an image. Then, the method 100 proceeds to block 106. At block 106, the polarization optics of the light beam 62 are controlled, as discussed in detail above, to reroute the image encoded by the SLM 64, thereby allowing each vehicle occupant 11 to view the image.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A multiview campfire display, comprising:
a light source configured to emit a light beam;
a spatial light modulator (SLM) positioned to receive the light beam emitted by the light source, wherein the SLM is configured to encode an image;
a user tracker configured to track a head and eyes of a plurality of vehicle occupants, wherein the user tracker is configured to generate an eye-tracking signal, and the eye-tracking signal is indicative of a position of the eyes of each of the plurality of vehicle occupants, wherein the user tracker includes at least one camera;
a plurality of reflectors and a plurality of movable mounts each coupled to one of the plurality of reflectors to allow each of the plurality of reflectors to move; and
a controller in communication with the plurality of movable mounts, the user tracker, the light source, and the SLM, wherein the controller is programmed to:
receive the eye-tracking signal from the user tracker; and
command each of the plurality of movable mounts to align the image to eyes of each of the plurality of vehicle occupants; and
control a polarization optics of the light beam emitted by the light source and modulated by the SLM to reroute the image encoded by the SLM for the plurality of vehicle occupants based on the eye-tracking signal;
wherein the multiview campfire display allows plurality of vehicle occupants to see the image due to multiplexing.

2. The multiview campfire display of claim 1, wherein each of the plurality of reflectors is a galvanized metal mirror.

3. The multiview campfire display of claim 2, wherein each of the plurality of movable mounts is a gimbal mount.

4. The multiview campfire display of claim 3, wherein the controller is programmed to control the light source and the SLM to use a holographic grating to reroute the image encoded by the SLM.

5. The multiview campfire display of claim 3, further comprising a digital micromirror device (DMD) positioned to receive the image encoded by the SLM, the DMD is also configured to reroute the image encoded by the SLM for the plurality of vehicle occupants, the DMD is in communication with the controller, and the controller is programmed to control the DMD to reroute the image encoded by the SLM for the plurality of vehicle occupants based on the eye-tracking signal, thereby allowing each of the plurality of vehicle occupants to view the image.

6. The multiview campfire display of claim 3, further comprising a tunable liquid crystal (LC) polarization rotator in communication with the controller, wherein the tunable LC polarization rotator is positioned to receive the image encoded by the SLM, wherein the controller is programmed to control the tunable LC polarization rotator to reroute the image encoded by the SLM for the plurality of vehicle occupants based on the eye-tracking signal, thereby allowing each of the plurality of vehicle occupants to view the image.

7. The multiview campfire display of claim 6, further comprising a polarized beam splitter (PBS) downstream of the tunable LC polarization rotator, and the PBS is configured to reroute the image encoded by the SLM.

8. The multiview campfire display of claim 7, where each of the plurality of reflectors are positioned downstream of the PBS to align the image to eyes of each of the plurality of vehicle occupants.

9. A vehicle of claim 1, comprising:
a vehicle body defining a passenger compartment;
a multiview campfire display disposed in the passenger compartment, wherein the multiview campfire display includes:
a light source configured to emit a light beam;
a spatial light modulator (SLM) positioned to receive the light beam emitted by the light source, wherein the SLM is configured to encode an image;
a user tracker configured to track a head and eyes of a plurality of vehicle occupants, wherein the user tracker is configured to generate an eye-tracking signal, and the eye-tracking signal is indicative of a position of the eyes of each of the plurality of vehicle occupants, wherein the user tracker includes at least one camera;
a plurality of reflectors and a plurality of movable mounts each coupled to one of the plurality of reflectors to allow each of the plurality of reflectors to move; and
a controller in communication with the user tracker, the light source, and the SLM, wherein the controller is programmed to:
receive the eye-tracking signal from the user tracker;
command each of the plurality of movable mounts to align the image to eyes of each of the plurality of vehicle occupants; and
control a polarization optics of the light beam emitted by the light source and modulated by the SLM to reroute the image encoded by the SLM for the plurality of vehicle occupants based on the eye-tracking signal, thereby allowing each of the plurality of vehicle occupants to view the image;
wherein the multiview campfire display allows the plurality of vehicle occupants to see the image due to multiplexing.

10. The vehicle of claim 9, wherein each of the plurality of reflectors is a galvanized metal mirror.

11. The vehicle of claim 10, wherein each of the plurality of movable mounts is a gimbal mount.

12. The vehicle of claim 11, wherein the controller is programmed to control the light source and the SLM to use a holographic grating to reroute the image encoded by the SLM.

13. The vehicle of claim 11, further comprising a digital micromirror device (DMD) positioned to receive the image encoded by the SLM, the DMD is also configured to reroute the image encoded by the SLM for the plurality of vehicle occupants, the DMD is in communication with the controller, and the controller is programmed to control the DMD to reroute the image encoded by the SLM for the plurality of vehicle occupants based on the eye-tracking signal, thereby allowing each of the plurality of vehicle occupants to view the image.

14. The vehicle of claim 11, further comprising a tunable liquid crystal (LC) polarization rotator in communication with the controller, wherein the tunable LC polarization rotator is positioned to receive the image encoded by the SLM, wherein the controller is programmed to control the tunable LC polarization rotator to reroute the image encoded by the SLM for the plurality of vehicle occupants based on the eye-tracking signal, thereby allowing each of the plurality of vehicle occupants to view the image.

15. The vehicle of claim 14, further comprising a polarized beam splitter (PBS) downstream of the tunable LC polarization rotator, and the PBS is configured to reroute the image encoded by the SLM.

* * * * *